Nov. 29, 1966 M. J. MARKAKIS ET AL 3,288,385

SENSING DEVICE

Filed March 18, 1964

INVENTORS
MICHAEL J. MARKAKIS &
CHARLES E. MENDENHALL

BY Robert G. Clay

ATTORNEY 3,288,385
SENSING DEVICE

Michael J. Markakis, Palo Alto, and Charles E. Mendenhall, Redwood City, Calif., assignors to Ampex Corporation, Redwood City, Calif., a corporation of California Filed Mar. 18, 1964, Ser. No. 352,732
5 Claims. (Cl. 242—55.11)

The present invention relates generally to a sensing apparatus, and more particularly to a light-operated sensing apparatus for use with a tape recorder to indicate when a certain point in the travel of the tape, particularly the end of the tape, is reached.

Various prior devices have been employed with tape recorders that indicated generally when a position such as the end of the tape on a reel was reached. One such device was controlled by the bulk of tape remaining on the reel and thus to ensure stopping before the end of the tape was reached it would normally include a certain margin of error. This would often result in losing recording time on the tape because the indication would be made before the actual end of the tape was reached.

In addition other devices in the prior art provided a metal part or a magnetic impulse on the tape itself to indicate when the end of the tape had been reached. Such a construction has several disadvantages. For one thing, the sensing devices were relatively expensive. Also, the tape may be positioned inadvertently with the wrong side of the tape facing the sensing apparatus so that no signal or an inadequate signal would be given to the sensing apparatus. Further, such construction which included attaching metal elements to the tape could become bulky and the attached parts were susceptible of becoming loosened.

It is a principal object of the present invention to provide an improved sensing aparatus for indicating when a particular point in the travel of a tape, particularly the end thereof, is reached.

Another object of the present invention is the provision of an improved sensing apparatus for a tape recorder, which apparatus is operated by differences in the light transmitted to a light-sensing means by light-transmitting and non light-transmitting portions of the tape.

It is still another object of this invention to provide a simple, economic and durable construction of sensing apparatus of the type illustrated and described.

Other objects and advantages of the present invention will become apparent from the following description and from the drawings, wherein.

Figures 1, 2, 3, 4, 5, 6:
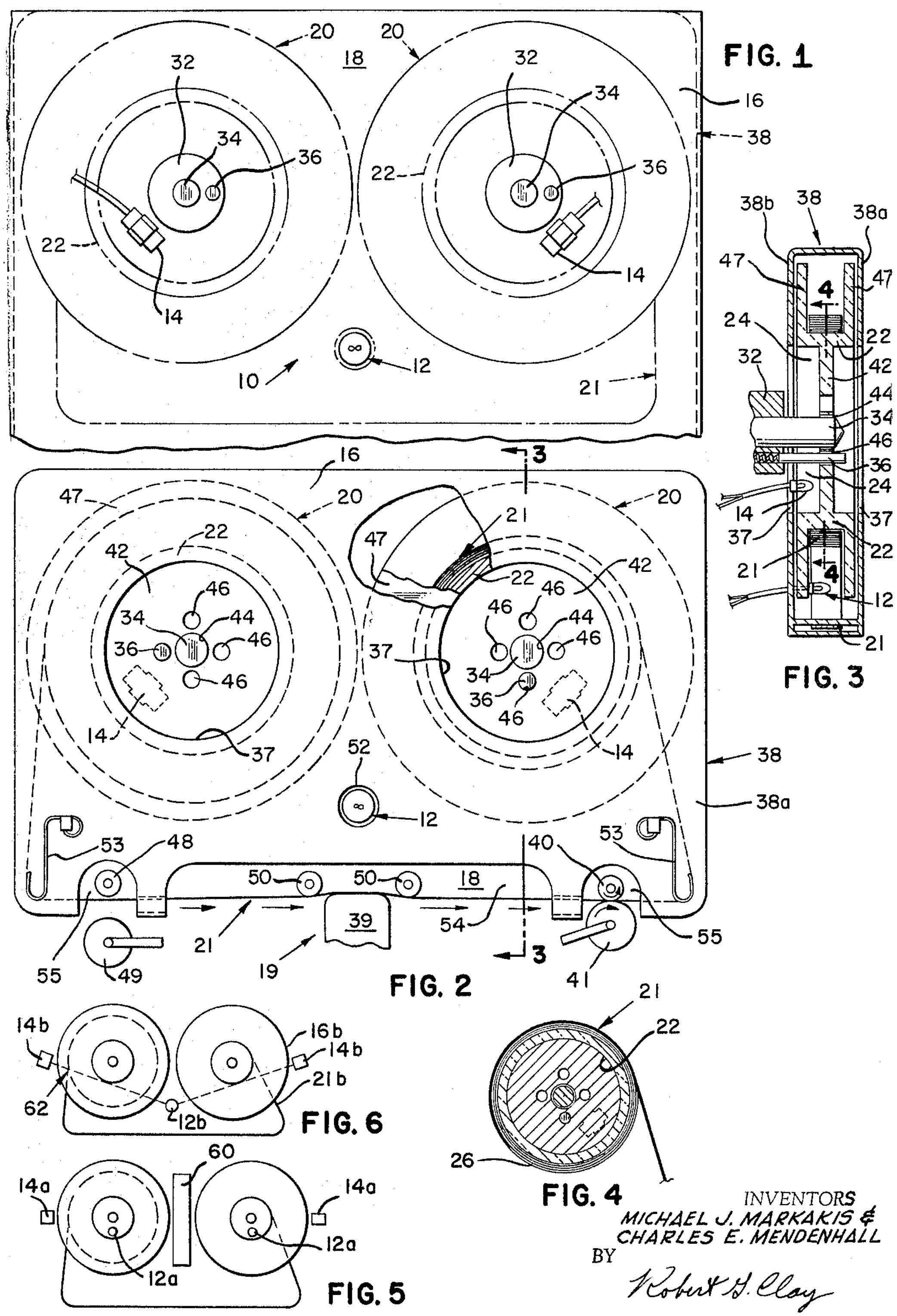
FIGURE 1 is a front view of a portion of a tape transport of a tape recorder adapted to receive a tape cartridge, this view also including a representation in phantom of a portion of the tape cartridge in its position relative to the transport, the illustrated structure embodying various features of the present invention and being a preferred embodiment thereof.
FIGURE 2 is a front view of the portion of the tape transport shown in FIGURE 1 with the tape cartridge mounted in position on the transport.
FIGURE 3 is a reduced sectional view taken generally along line 3—3 of FIGURE 2.
FIGURE 4 is an enlarged sectional view taken generally along line 4—4 of FIGURE 3, showing an end portion of the tape including the leader wrapped around the hub of a tape reel.
FIGURES 5 and 6 are schematic sketches of modified forms of tape transport.

Briefly, the form of sensing apparatus 10 illustrated in FIGURES 1 through 4 comprises a light source or light-producing means in the form of an electric light bulb 12 and light-responsive means in the form of a pair of photoelectric cells 14, all of which are mounted on the tape deck or plate 16 of a tape transport 18 of a magnetic tape recording and reproducing system or machine 19. Each cell 14 is positioned adjacent a turntable for a tape reel 20. Each reel 20 of the illustrated structure has a generally tubular hub 22 which in combination with the turntable defines annular cavity 24 facing the tape deck 16. Each cavity 24 receives the associated photoelectric cell 14. The wall of the illustrated hubs 22 are light-transmitting. A tape 21, which is wound from either end around the hubs of the two reels, has a light-transmitting leader 26 connecting it at each end to one of the reels 20. The light bulb 12 is positioned generally between the reels and in a common plane so that it shines on the tape rolled on the hubs of both reels. When the tape nears the end on either reel 20 so that only the light-transmitting leader 26 is between the light bulb 12 and the hub 22 of that reel, the light passes through the leader 26 and the hub 22 to impinge upon the photoelectric cell 14 for that reel and to actuate that cell to produce the desired action by the tape recorder 19 such as stopping the motion of the tape or shutting off the recorder.

Now considering the tape transport 18 that is illustrated in FIGURES 1 through 4 in further detail, the tape deck or plate 16 of the transport is disposed vertically. While the transport 18 will be described in this orientation, it should be understood that insofar as the present invention is concerned the plate 16 could be horizontal or at some other angle.

As shown best in FIGURE 1, the illustrated tape transport 18 includes the pair of turntables 32 that are rotatably mounted on the tape deck 16. Each turntable includes a coaxially arranged mounting spindle 34. The axes of the turntables 32 are generally horizontal, parallel to one another, and at the same level. Each turntable 32 also includes a small connecting pin 36 which is normally biased to extend outwardly from the forward face of the turntable but which is spring-loaded so as to retract within the turntable when pressure is exerted against it.

As shown best in FIGURE 2, the tape 21 is contained in a tape cartridge 38 which is of generally rectangular hollow construction, having a pair of large generally rectangular flat face walls **38*a* and 38*b* separated by side walls. The illustrated tape cartridge 38 is so constructed that it may be positioned or mounted on the tape transport 18 with either face wall 38*a* or 38*b* adjacent to the plate 16 of the transport. The cartridge 38 is shown in FIGURE 3 with the face wall 38*b* adjacent the plate 16**.

The tape cartridge 38 is supported in generally the proper position by suitable support means (not shown) on the tape transport 18. The pair of reels 20 are supported within respective cylindrical cavities in the cartridge 38, which are of larger diameter than the reels to permit limited movement thereof. Apertures 37 in the walls **38*a* and 38*b* at either side of each reel 20 provide access to the reels no matter which face wall is adjacent the plate 16**.

As shown best in FIGURE 3, each of the illustrated reels 20 includes the generally cylindrical hub 22 which is larger in diameter than the turntable 32 to thereby define the annular cavity 24 between the turntable and the hub when the cartridge is in position on the tape transport. The hub 22 is made of a light-transmitting medium such as clear plastic for a purpose hereinafter described. A transverse center wall or plate 42 extends across the hub intermediate its ends. A center hole of aperture 44 is located generally centrally of the wall 42, which aperture receives one of the spindles 34 to both position and support the reel 20 when the cartridge is in place on the tape transport. Each center wall 42 also includes four small connecting apertures or holes 46 circumferentially disposed around the center hole or aperture 44. These connecting apertures 46 are adapted to receive the connecting pin 36 on the associated turntable 32. More particularly, the connecting pins 36 are the same distance from the center of the spindle 34 as the connecting apertures 46 are from the center of the central hole or aperture 44. If, when the cartridge 38 is placed upon the tape transport, either pin 36 is aligned with a connecting aperture 46, it will enter that aperture to establish a rotational connection between a reel and the associated turntable 32. Any pin 36 that is not initially aligned with a connecting aperture will be temporarily depressed into the turntable 32. Any subsequent rotation between the reel and the turntable will permit the pin 36 to enter one of the apertures 46 to establish a driving rotational connection between the turntable and the reel. Each reel 20 also comprises a pair of circular annular flanges 47 secured to and extending outwardly from either end of the hub 22 of the reel. The flanges 47 are preferably made of an opaque material for a purpose which is hereinafter described in detail.

Motor means (not shown) are associated with each of the reels 20 for fast winding of the tape. The motor means also wind the tape onto the reel that acts as the take-up reel and serves as a brake for the reel that acts as the supply reel so that the desired tension is maintained on the tape as it is drawn past one or more tape heads.

As shown best in FIGURE 2, in the illustrated cartridge 38, the tape 21 intermediate the reels is guided and maintained along an extended path having a long horizontal section near the lower side of the cartridge by suitable corner guides 53. The cartridge 38 is provided with one large central recess 54 and two small side recesses 55 along its lower edge to expose portions of the tape in the horizontal section. When the tape cartridge 38 is initially assembled on the tape transport 18, the exposed portions of the tape 21 in the small side recesses 55 are respectively disposed between a rotatable forward drive capstan 40 and a cooperating pressure or pinch roller 41 and between a rotatable reverse drive capstan 48 and a cooperating pressure or pinch roller 49. The capstans 40 and 48 and the rollers 41 and 49, which comprise the tape driving means for the illustrated transport, are mounted on the tape deck or plate 16. The axes of the illustrated capstans 40 and 48 are fixed while the pinch rollers 41 and 49 are movable into pressure engagement with the capstans. The exposed tape 21 in the central recess 54 is disposed between one or more tape heads 39 and guide pins 37 that are supported on the plate 16. The axes of the guide pins 50 are fixed while the tape heads are movable toward the tape path. The pressure rollers 41 and 49 and the tape heads 39 are normally in a lowered position to permit the tape cartridge 38 to be positioned on the transport with the drive capstans 40 and 48 and the guide pins 50 extending into the recesses of the cartridge above the path of exposed portion of the tape. When the recorder is put into recording or playback condition, the forward drive pinch roller 41 presses the tape against the forward drive capstan 40 and the heads 39 are raised against the tape, while the reverse drive pin roller remains lowered. For reverse drive of the tape, the reverse drive pinch roller 49 presses the tape against the reverse drive capstan 48 while the pinch roller 41 is lowered. For fast movement in either direction the tape heads 39 are lowered out of engagement with the tape.

As shown in FIGURES 1 to 3, each photoelectric cell 14 is secured to the tape deck or plate 16 radially outwardly of one of the turntables 32 and in alignment with the annular cavity 24 defined by the associated reel 20 and the turntable. The associated aperture 37 in the wall 38*b* of the cartridge 38 is sufficiently large to permit the photoelectric cell 14 to extend, when the cartridge is assembled onto the tape transport, at least partially into the associated annular cavity 24 (FIGURE 3). The photoelectric cells 14 are connected to suitable circuits in the tape recorder which, for example, deactivate the recorder when the cells are activated.

As shown in the drawings, the light source is in the form of an electric bulb 12 which is secured to the tape deck or plate 16 generally between the two reels 20. A pair of opposed apertures 52 are provided in the face walls 38*a* and 38*b* of the cartridge 38 for receiving the bulb 12 no matter which wall of the cartridge is assembled adjacent to the tape transport. The path of light from the bulb 12 to each of the photoelectric cells 14 is substantially blocked by the body or roll of tape 21 on the hub 22, the hub itself being of light-transmitting material. The flanges 47 being of opaque material reduce the effects of other lights on the photoelectric cells. Also, the leader 26 which connects each end of the tape 21 to one of the hubs 22 is of a light-transmitting material as may be provided by clear or translucent plastic.

Thus, when the tape 21 is unrolled from one of the reels 20 to the point where only the light-transmitting leader 26 and the light-transmitting hub wall are disposed between the bulb 12 and the photoelectric cell 14 associated with that reel 20 (FIGURE 4), the light is transmitted to to and activates the photoelectric cell 14 to thereby produce a desired effect upon the operation of the tape machine. When the tape 21 is further wound around the hub 22, the tape itself serves to sufficiently block light transmission to the photoelectric cell associated with that reel to prevent its actuation. It may be noted that only one of the cells 14 is activated at a time because when the tape is at an end at one reel it is almost fully wound on the other reel to block the light from the cell of that other reel.

By using this arrangement and construction of elements, the photoelectric cell is actuated in the illustrated structure when the tape reaches a predetermined position, to wit: when the end of the tape reaches a position between the light bulb and the cell. If extreme precision is desired, the leader 26 may be precisely determined and its particular point of connection to the hub 22 may also be particularly determined. In a more usual situation, however, the leader 26 is merely made sufficiently long to ensure that there is sufficient reaction time for the desired effect on the operation of the tape machine to be achieved before the end of the leader can become disconnected from the reel.

The particular form and construction of sensing apparatus shown in FIGURES 1 through 4 provides various advantages. For example, a single centrally located light bulb 12 serves for both of the photoelectric cells and serves to activate the associated photoelectric cell when the tape reaches the end of either of the reels. Further, the placement of the photoelectric cells within the annular cavity of the reels 24 permits a compact structure.

While the particular illustrated structure offers particular advantages, it would, of course, be possible to vary the details of construction without departing from the spirit and scope of the invention. For example, FIGURE 5 illustrates diagrammatically a structure where the photoelectric cells and the light sources have been generally reversed so that a light source 12*a* is within the cavity of each reel while the photoelectric cell 14*a* associated with each of the reels is located outwardly of the associated reel. In such a modified construction it may be desirable to use shielding or blocking means such as illustrated at 60 in FIGURE 5 to prevent the light source of one reel from affecting the photoelectric cell associated with the other reel. Also, the light source 12*a* is directed and the photoelectric cell 14*a* is preferably provided with a shield to prevent other light sources from impinging on the photoelectric cell.

Another example of a possible modified structure is illustrated in FIGURE 6. The photoelectric cells 14*b* are located on the tape deck or plate 16*b*, not within cavities in the reels, but outwardly of the reels. In this configuration, the light from the bulb **12*b* is blocked from each of the photocells 14*b* by a length of the tape 21*b* that is adjacent to the reel. Thus, neither photoelectric cell 14*b* is actuated until the tape reaches its end at one of the reels to bring the light-transmitting leader 26*b* at that end of the tape between the bulb 12*b* and the cell 14*b*. When the latter point is reached, the associated photoelectric cell 14*b* is actuated and the desired effect produced on the tape recorder. This modification also is preferably provided with means for preventing other light sources from affecting the photoelectric cells. The cells 14*b* are positioned so that a roll or body of tape on one of the reels will block the cell associated with that reel from the light source 12*b*. Thus, even if the light-transmitting leader 26*b* from the reel shown on the right in FIGURE 6 reaches the point designated 62**, the cell associated with the reel shown on the left is not also actuated because the light path is blocked by the roll of tape on the left reel.

What is claimed is:

1. Apparatus for a tape system for sensing when the end of a recording tape has been reached and then producing a predetermined effect upon the operation of the system, the tape being relatively nonlight-transmitting but having a light-transmitting portion at the end thereof, said apparatus comprising:
   (a) a frame,
   (b) a tape reel rotatably supported on said frame, said reel having a hollow tubular hub that includes light-transmitting means and is adapted to have the recording tape wound around it with the light-transmitting portion closest to said hub,
   (c) a light-producing element on said frame,
   (d) a light-responsive element on said frame, one of said elements being disposed within said hub, the other of said elements being disposed outside of said hub,
   (e) means operated by the actuation of said light-sensitive element to affect the operation of the tape system, whereby said light-responsive element will be actuated when the tape wound on said reel has sufficiently unwound so that only the light-transmitting end portion extends between said light-producing element and said light-responsive element.

2. Apparatus for a tape system for sensing when the end of a recording tape has been reached and then producing a predetermined effect upon the operation of the system, and the tape being relatively nonlight-transmitting but having a light-transmitting length at either end thereof, said apparatus comprising:
   (a) a frame,
   (b) a pair of tape reels rotatably supported on said frame, each of said reels having a hollow tubular hub that includes light-transmitting means and is adapted to have one end of the recording tape wound around it with the light-transmitting length innermost,
   (c) a light-producing means on said frame disposed outwardly of said hub,
   (d) a pair of light-responsive elements on said frame, each of said light-responsive elements being disposed within one of said hubs,
   (e) means operated by the actuation of either of said light-responsive elements to produce a predetermined effect upon the tape system associated with the light-responsive element that is actuated, whereby one of said light-responsive elements will be actuated when the tape on the associated reel has sufficiently unwound so that only the light-transmitting end length extends between said light-producing means and said one light-responsive element.

3. Apparatus associated with a tape recording and reproducing system, said apparatus comprising:
   (a) a frame including a generally flat chassis plate,
   (b) a pair of tape reels rotatably mounted on said chassis plate on spaced apart axes that extend generally perpendicular to said plate, each of said reels including a generally tubular central hub having a light-transmitting side wall defining a cavity within said hub opening to said chassis plate, each of said reels being adapted to connected to one end of a magnetic tape and have the tape wound around said hub, the magnetic tape being of a relatively nonlight-transmitting material but having a length at either end of a light-transmitting material,
   (c) a pair of light-sensitive photoelectric cells secured to said chassis plate, each of said photoelectric cells being positioned adjacent to the axis for one of said reels and extending at least partially into the cavity in the hub of said one reel,
   (d) a continuously operating source of light that is secured to said chassis plate and positioned in a generally common plane with said reels, said source of light being disposed generally between and outwardly of said tubular hubs of said reels, and
   (e) means connected to each of said photoelectric cells to affect the operation of the tape system incident to the cell being actuated by being exposed to sufficient light from the continuously operating source of light, said elements being arranged and disposed so that when the tape is sufficiently unwound from either of said reels so that no more nonlight-transmitting tape but only light-transmitting leader is disposed between the light source and the photoelectric cell associated with that reel, the light will pass through the light-transmitting leader and the light-transmitting wall of the tubular hub of that reel to cause the associated photoelectric cell to be actuated.

4. Apparatus for a tape recording/reproducing system for sensing when the end of a recording tape has been reached, the tape being relatively nonlight-transmitting but having a light-transmitting length at either end thereof, said apparatus comprising:
   (a) a frame,
   (b) a pair of spaced-apart tape reels rotatably supported on said frame, each of said reels adapted to have one end of the tape wound around it with the light-transmitting length innermost,
   (c) means on said frame for guiding the tape in an intermediate path between said reels,
   (d) a light-producing means on said frame disposed generally coplanar with and between said reels, and
   (e) a pair of light-sensing elements on said frame, each of said light-sensing elements being disposed adjacent one of said reels and opposite the tape in the intermediate path from said light-producing means, each of said light-sensing elements being positioned so that the adjacent reel itself does not block the line of sight between said element and said light-producing means but so that a substantial roll of the tape on that reel will block that line of sight.

5. Apparatus for a tape recording/reproducing system for sensing when the end of a recording tape has been reached and then producing a predetermined effect upon the operation of the system, the tape being relatively nonlight-transmitting but having a light-transmitting length at either end thereof, said apparatus comprising:
   (a) a frame,
   (b) a pair of spaced-apart tape reels rotatably supported on said frame, each of said reels adapted to have one end of the tape wound around it with the light-transmitting length innermost,
   (c) means on said frame for guiding the tape in an intermediate path between said reels,
   (d) a light-producing means on said frame disposed generally coplanar with and between said reels,
   (e) a pair of light-responsive elements on said frame, each of said light-responsive elements being disposed adjacent one of said reels and opposite the tape in the intermediate path from the light-producing means, each of said light-responsive elements being positioned so that the adjacent reel itself does not block the line of sight between said element and said light-producing means but a substantial roll of the tape on that reel will block that line of sight, and (f) means operated by the actuation of either of said light-responsive elements to produce upon the tape system a predetermined effect associated with the light-responsive element that is actuated.

References Cited by the Examiner

UNITED STATES PATENTS

| | | | |
|---|---|---|---|
| 2,926,860 | 3/1960 | Pomarico | 242—55.12 |
| 2,971,716 | 2/1961 | Sampson | 242—55.13 |
| 3,103,318 | 9/1963 | Van Duyne | 242—55.12 |

FRANK J. COHEN, *Primary Examiner.*

LEONARD D. CHRISTIAN, *Examiner.*